(12) United States Patent
Fukazawa

(10) Patent No.: US 7,370,897 B2
(45) Date of Patent: May 13, 2008

(54) ARTICLE GRIPPING DEVICE

(75) Inventor: Hisashi Fukazawa, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 9 days.

(21) Appl. No.: 10/855,345

(22) Filed: May 28, 2004

(65) Prior Publication Data
US 2004/0239134 A1 Dec. 2, 2004

(30) Foreign Application Priority Data
May 29, 2003 (JP) .............................. 2003-153011

(51) Int. Cl.
*B25J 15/00* (2006.01)
(52) U.S. Cl. ................... 294/119.2; 156/406.2
(58) Field of Classification Search ............. 294/119.2; 156/126, 403, 406.2, 421.8
See application file for complete search history.

(56) References Cited

U.S. PATENT DOCUMENTS

| | | | |
|---|---|---|---|
| 3,909,336 A | * | 9/1975 | Takahashi et al. ....... 156/406.2 |
| 4,105,486 A | * | 8/1978 | Cantarutti ................ 156/406.2 |
| 4,437,920 A | * | 3/1984 | Kubo ...................... 156/406.2 |
| 4,964,931 A | * | 10/1990 | Ring ......................... 156/403 |
| 5,071,498 A | * | 12/1991 | Nishiide et al. ............ 156/132 |
| 5,441,587 A | * | 8/1995 | Byerley .................... 156/406.2 |
| 5,635,016 A | * | 6/1997 | Byerley .................... 156/406.2 |
| 5,709,768 A | * | 1/1998 | Byerley .................... 156/406.2 |
| 5,858,165 A | * | 1/1999 | Takasuga ..................... 156/403 |

FOREIGN PATENT DOCUMENTS

| | | | | |
|---|---|---|---|---|
| JP | 59-70550 | * | 4/1984 | ................. 156/396 |
| JP | 60-119528 U1 | | 8/1985 | |
| JP | 01-059622 U1 | | 4/1989 | |
| JP | 06-170982 A1 | | 6/1994 | |

* cited by examiner

*Primary Examiner*—Saul Rodriguez
*Assistant Examiner*—Paul T Chin
(74) *Attorney, Agent, or Firm*—Greer, Burns & Crain, Ltd.

(57) ABSTRACT

An article gripping device includes a device body, a first ring fixed to the device body, a plurality of gripping members, a second ring, a driving mechanism and a plurality of linking mechanisms. The plurality of gripping members are arranged in a circumferential direction on an inner periphery side of the first ring with the gripping members capable of moving in a radial direction of the first ring. Corresponding end portions of each of the adjacent gripping members of the gripping members engage with each other. The second ring is capable of turning in the circumferential direction with respect to the first ring. The driving mechanism turns the second ring in the circumferential direction and is mounted to the first ring. The plurality of linking mechanisms move the gripping members in a radial direction of the first ring in association with the turning of the second ring.

10 Claims, 5 Drawing Sheets

ARTICLE GRIPPING DEVICE

BACKGROUND OF THE INVENTION

1. Field of the Invention

The present invention relates to an article gripping device for gripping, for example, a tire from the radial direction in a tire forming process.

2. Description of the Related Art

Conventionally, when a tire having been assembled into a ring shape by using predetermined members is conveyed in the axial direction of the tire in a tire forming process, a device for gripping the tire from the outside in the radial direction has been used. As this article gripping device, there is known an article gripping device in which a plurality of gripping members are provided at predetermined intervals on a ring-shaped frame, and the gripping members are operated by a link mechanism operating in association with the operation of a driving cylinder, by which the gripping members are brought into contact under pressure with the outer peripheral surface of an article.

However, in the conventional article gripping device, since the gripping members arranged at intervals in the circumferential direction are respectively brought into contact under pressure with the article, there is produced a gap between the adjacent gripping members. Therefore, the article cannot be gripped in a state of a nearly complete round, so that there is a possibility that the outer peripheral portion of article is deformed, or the center thereof shifts.

SUMMARY OF THE INVENTION

The present invention has as an object to provide an article gripping device capable of always gripping an article to be gripped in a state of a nearly complete round.

To achieve the above object, the present invention provides an article gripping device including a device body; a first ring fixed to the device body; and a plurality of gripping members arranged in a circumferential direction on an inner periphery side of the first ring, the gripping members capable of moving in a radial direction of the first ring, both end portion in the circumferential direction each of the gripping members being formed so that each of adjacent gripping member of the gripping members engage with each other.

Thereby, no gap is produced between the gripping members for gripping the article, and hence the outer periphery of article to be gripped can be gripped in a state of a nearly complete round. Therefore, the outer periphery of article to be gripped can be gripped without a gap, so that the quality of completed article can be improved.

Also, the article gripping device further includes a second ring capable of turning in the circumferential direction with respect to the first ring; a driving mechanism for turning the second ring in the circumferential direction; and a plurality of linking mechanisms for moving the gripping members in a radial direction of the first ring in association with the turning of the second ring.

Thereby, the operations of the gripping members can be synchronized by the second ring. Therefore, since the operations of the gripping members can be synchronized, the article can be gripped always without producing a positional shift of the center thereof.

Also, the article gripping device further includes a support mechanism for supporting the gripping member so that the gripping member can be moved in the radial direction of the first ring.

Thereby, the gripping member can be brought into contact perpendicularly with the outer periphery of article by the support mechanism. Therefore, since the gripping member can be brought into contact perpendicularly with the outer periphery of the article to be gripped, the article can be gripped always without producing a positional shift in the circumferential direction.

Also, the linking mechanism is provided with an adjusting mechanism capable of adjusting a position of the gripping member in the radial direction of the first ring.

Thereby, even if a positional shift of the gripping member is produced by a long-term use etc., the gripping surface can always be adjusted to a state of a nearly complete round by the adjusting mechanism. Therefore, even if a positional shift of the gripping member is produced by a long-term use etc., the gripping surface can always be adjusted to a state of a nearly complete round, so that the reliability of gripping accuracy can be enhanced.

Also, the gripping surface of the gripping member is formed so as to have a curvature not smaller than an outside diameter of the article having the maximum diameter of many kinds of articles to be gripped.

Thereby, the gripping surface can always be brought into face contact with the outer periphery of the article. Therefore, since the gripping surface can always be brought into face contact with the outer periphery of the article, an advantage is offered that the outer peripheral surface of the article is not deformed by the end portion of the gripping member.

The above and other objects, features, and advantages of the present invention will be apparent from the following detailed description and accompanying drawings.

DESCRIPTION OF THE PREFERRED EMBODIMENTS

Figure 1:
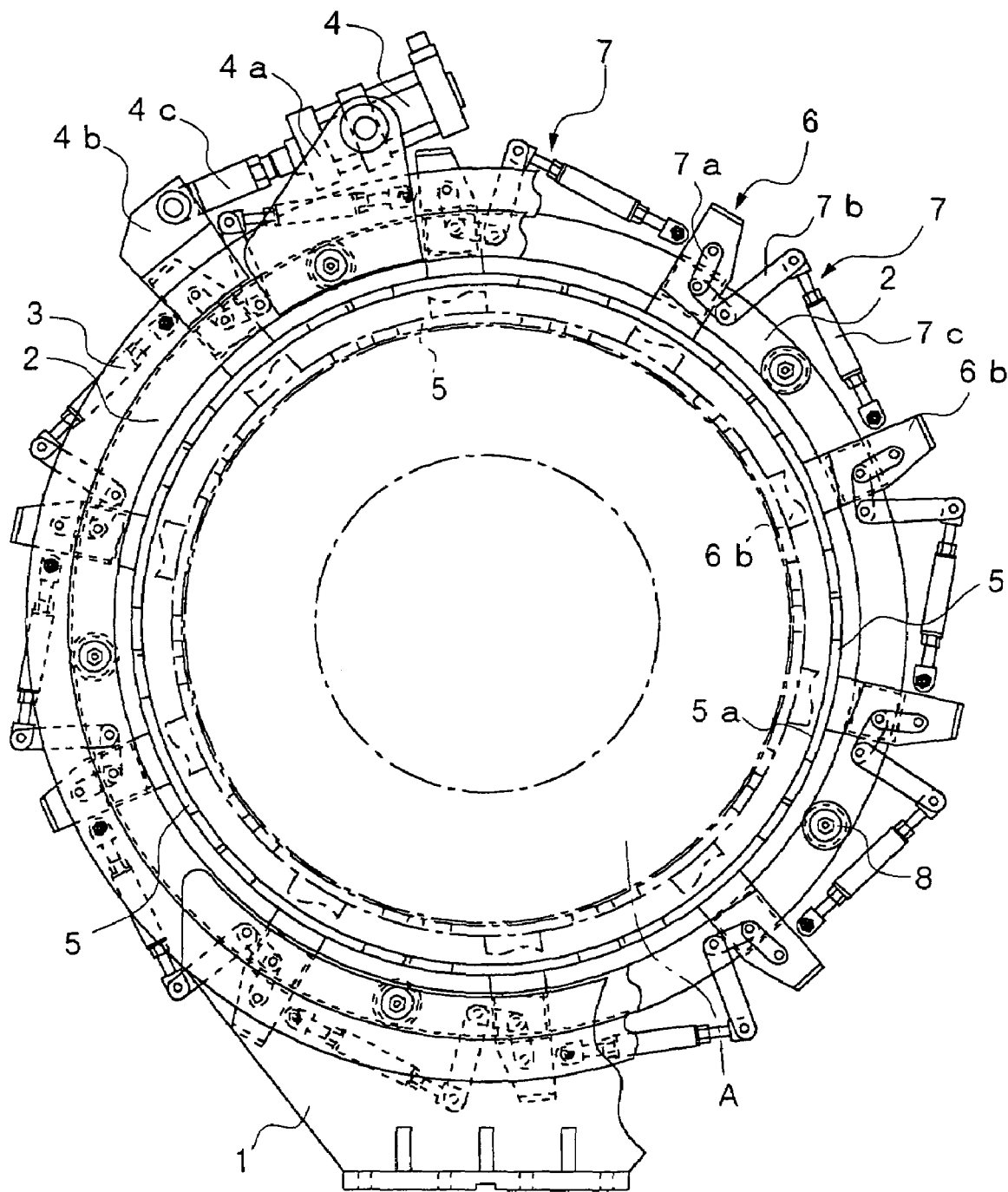
FIG. 1 is a front view of an article gripping device showing one embodiment of the present invention.
Figure 2:
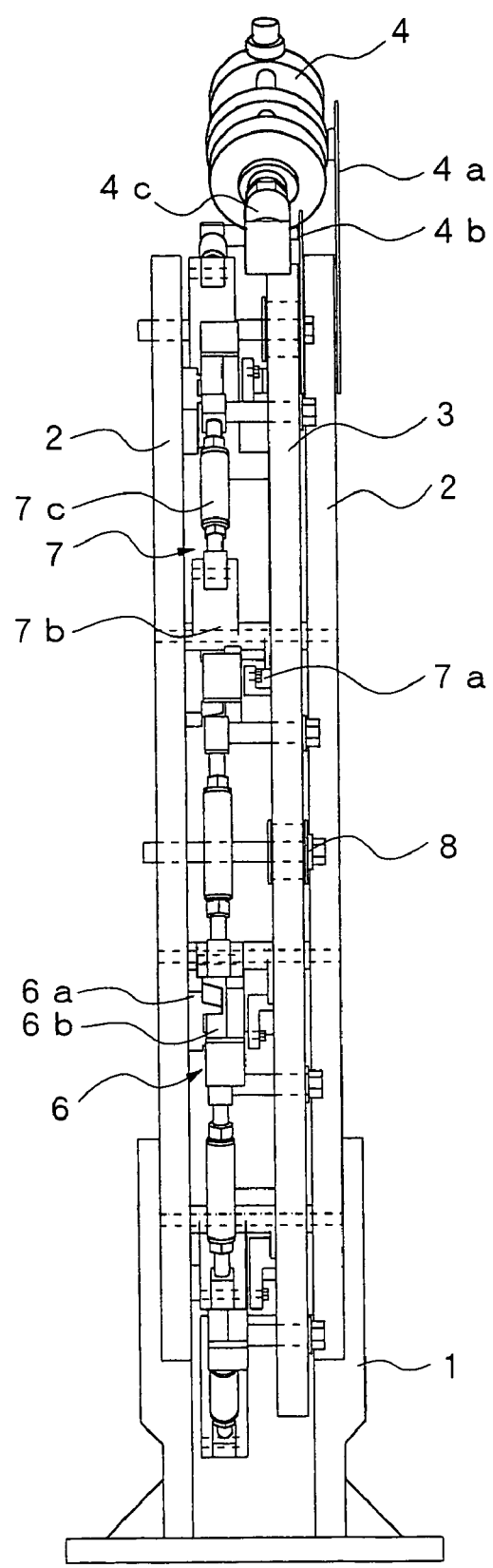
FIG. 2 is a side view of the article gripping device shown in FIG. 1.
Figure 3:
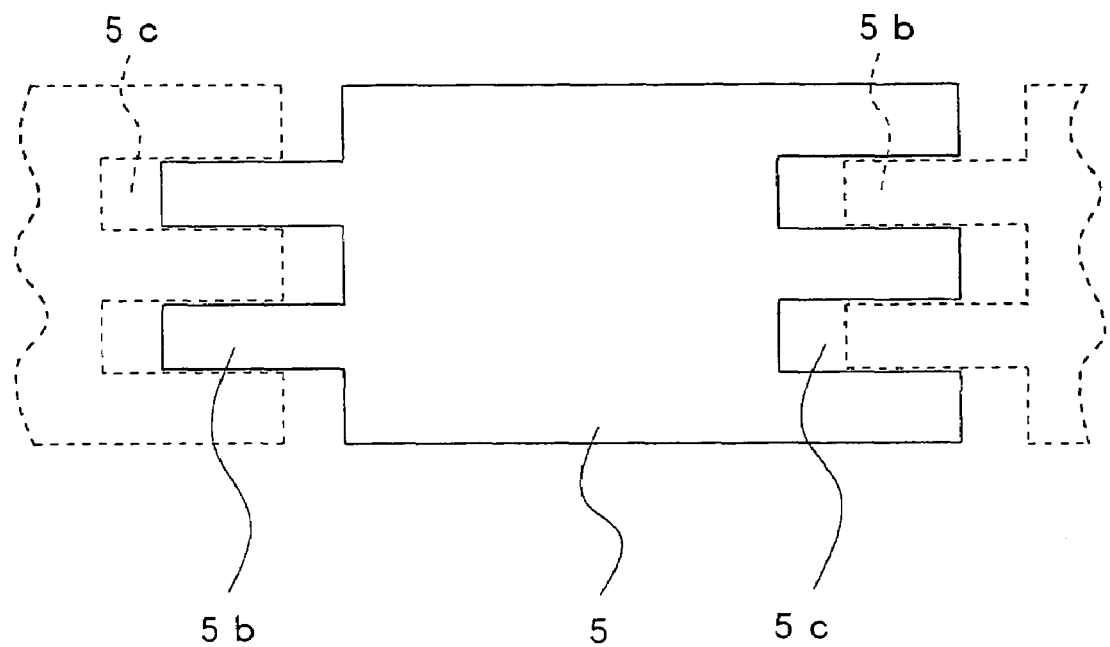
FIG. 3 is a plan view of a gripping member.
Figure 4:
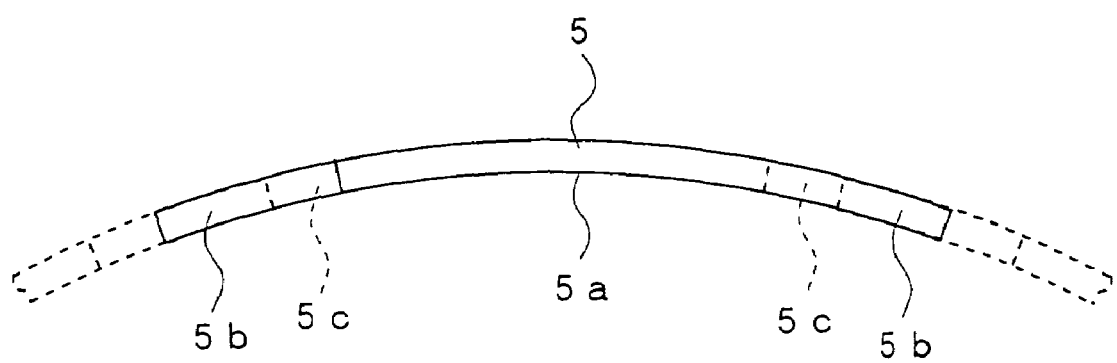
FIG. 4 is a side view of the gripping member shown in FIG. 3.
Figure 5:
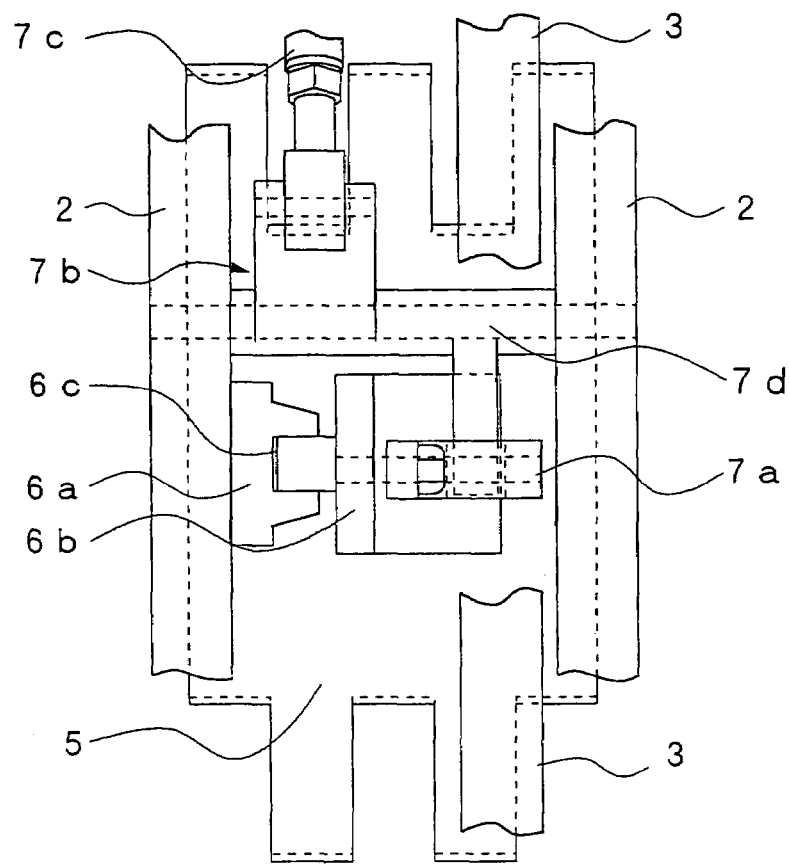
FIG. 5 is a plan view of an essential portion of an article gripping device.
Figure 6:
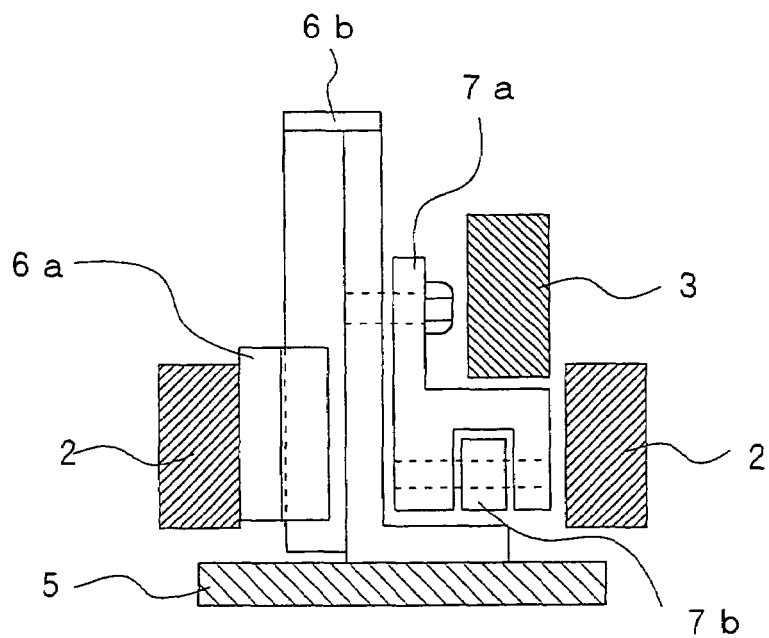
FIG. 6 is a side sectional view of the essential portion of an article gripping device shown in FIG. 5.
Figure 7:
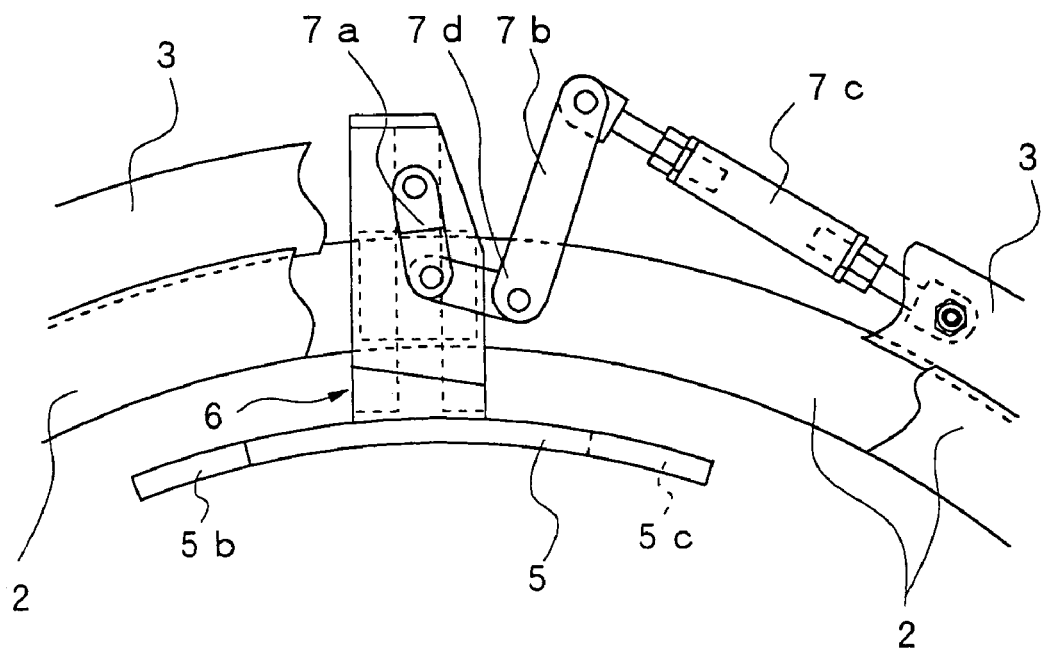
FIG. 7 is a front view of an essential portion showing the operation of a link mechanism.
Figure 8:
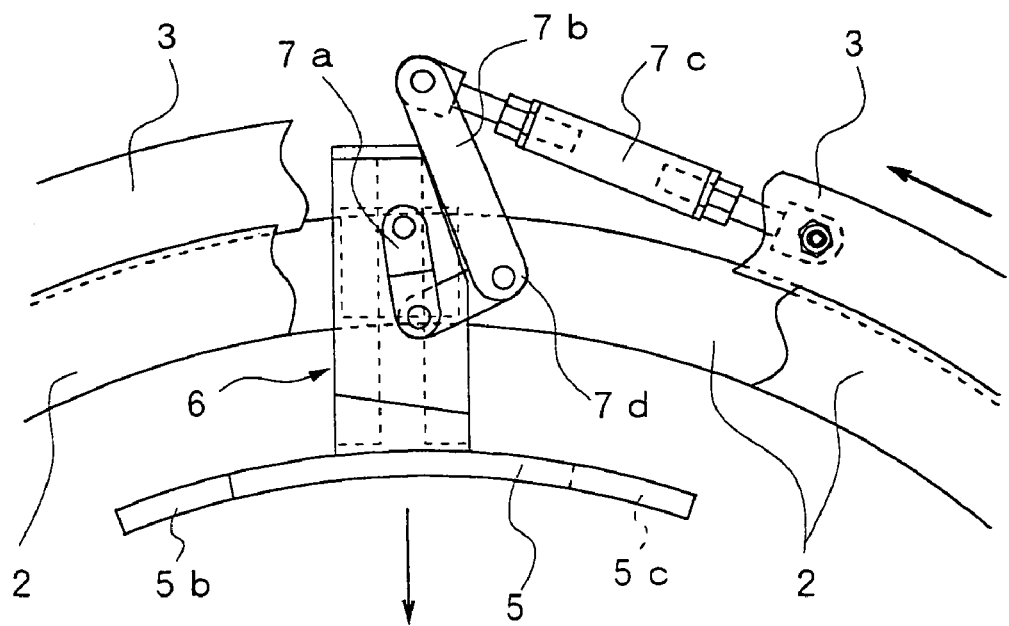
FIG. 8 is a front view of an essential portion showing the operation of a link mechanism.

An article gripping device shown in FIG. 1 includes a pair of first rings 2 fixed to a device body 1, a second ring 3 capable of turning in the circumferential direction with respect to the first rings 2, a driving cylinder 4 for turning the second ring 3, a plurality of gripping members 5 arranged in the circumferential direction on the inner periphery side of the first rings 2, a plurality of support mechanisms 6 for supporting the gripping members 5 so that the gripping members 5 can be moved in the radial direction of the first ring 2, and a plurality of link mechanisms 7 for moving the gripping members 5 in association with the turning of the second ring 3.

The device body 1 is disposed on the lower end side of the first rings 2, and is provided so as to be capable of being moved in the longitudinal direction by moving means, not shown.

Each of the first rings 2 is formed by a ring-shaped member having an inside diameter larger than the external shape of a tire A, which is an article to be gripped. The first rings 2 are fixed to the device body 1 with an interval being provided therebetween in the longitudinal direction.

The second ring 3 is formed by a ring-shaped member having a diameter larger than that of the first ring 2. The second ring 3 is supported on the first rings 2 so as to be turnable in the circumferential direction by a plurality of guide rollers 8 provided between each of the first rings 2.

The driving cylinder 4 is fixed above the first rings 2 by a mounting member 4a, and a cylinder rod 4c thereof is connected to the second ring 3 via a connecting member 4b so that the second ring 3 can be turned in the circumferential direction by the driving cylinder 4.

Each of the gripping members 5 is formed by an arc-shaped plate member extending in the circumferential direction of the first ring 2. A gripping surface 5a of the gripping member 5 for gripping the tire A is formed so as to have a curvature equivalent to the outer peripheral surface of the tire A having the maximum diameter of many kinds of tires to be gripped. In both end portions in the circumferential direction of the gripping member 5, a plurality of finger portions 5b and notch portions 5c are provided widthwise to engage the end portions of the adjacent gripping members 5 with each other.

Each of the support mechanisms 6 includes a fixed member 6a fixed to the first ring 2 and a movable member 6b connected to the link mechanism 7. The movable member 6b engages with a groove 6c provided in the fixed member 6a so as to be slidable in the radial direction of the first ring 2. The gripping member 5 is fixed to one end of the movable member 6b.

Each of the link mechanisms 7 is made up of a first link 7a, a second link 7b, and an adjustment link 7c. The movable member 6b of the support mechanism 6 and the second ring 3 are connected to each other by the links 7a, 7b and 7c.

The first link 7a is formed into a straight shape, and one end thereof is connected to the movable member 6b and the other end thereof is connected to one end of the second link 7b.

The second link 7b is formed into an L shape, and one end thereof is connected to the other end of the first link 7a and the other end thereof is connected to one end of the adjustment link 7c. A bent portion 7d of the second link 7b is turnably connected to the first ring 2.

The adjustment link 7c is formed into a straight shape, and one end thereof is connected to the other end of the second link 7b and the other end thereof is connected to the second ring 3. The adjustment link 7c is constructed so that the link length can be adjusted arbitrarily by a publicly known turnbuckle provided in the center thereof. Therefore, the adjustment link 7c serves as an adjusting mechanism for adjusting the position of the gripping member 5.

In the article gripping device constructed as described above, when the tire A is gripped, the driving cylinder 4 is operated to project the cylinder rod 4c, by which the second ring 3 is turned in the circumferential direction with respect to the first rings 2. Along with the turning of the second ring 3, the second link 7b of the link mechanism 7 turns around the bent portion 7d connected to the first rings 2, and thus the movable member 6b moves in the radial direction of the first ring 2 along the groove 6c in the fixed member 6a. Thereby, the gripping members 5 are moved toward the inside in the radial direction of the first ring 2, by which the entire outer periphery of tire A is gripped by the gripping members 5.

At this time, since the finger portions 5b and the notch portions 5c in both end portions in the circumferential direction of the gripping members 5 are engaged with each other so as to connect the adjacent gripping members 5 to each other, the gripping members 5 are formed into a cylindrical shape without a gap.

After the tire A has been gripped, the device body 1 is moved in the longitudinal direction, by which the tire A is conveyed to a predetermined position.

If the gripping members 5 do not form a complete round due to a positional shift, the positions of the gripping members 5 are adjusted by adjusting the adjustment links 7c of the link mechanisms 7.

Thus, according to the article gripping device of this embodiment, both end portions in the circumferential direction of the gripping members 5 are constructed so that the end portions of the adjacent gripping members 5 engage with each other. Therefore, the outer periphery of the gripped tire A can be gripped without a gap, so that the quality of completed tire A can be improved.

The article gripping device of this embodiment has the second ring 3 turnable in the circumferential direction with respect to the first rings 2, the driving cylinder 4 for turning the second ring 3 in the circumferential direction, and the link mechanisms 7 for moving the gripping members 5 in the radial direction of the first ring 2 in association with the turning of the second ring 3. Therefore, the operations of the gripping members 5 can be synchronized, so that the tire A can be gripped always without producing a positional shift of the center thereof.

Also, the article gripping device of this embodiment has the support mechanisms 6 for supporting the gripping member 5 so that the gripping member 5 can be moved in the radial direction of the first ring 2. Therefore, the gripping member 5 can be brought into contact perpendicularly with the outer periphery of the tire A, so that the tire A can be gripped always without producing a positional shift in the circumferential direction.

Further, the link mechanism 7 is provided with the adjusting mechanism capable of arbitrarily adjusting the position of the gripping member 5 in the radial direction of the first ring 2. Therefore, even if a positional shift of the gripping member 5 is produced by a long-term use etc., the gripping surface 5a can always be adjusted to a state of a nearly complete round, so that the reliability of gripping accuracy can be enhanced.

Still further, the gripping surface 5a of the gripping member 5 is formed so as to have a curvature not smaller than the outside diameter of the tire A having the maximum diameter of many kinds of tires to be gripped. Therefore, the gripping surface 5a can always be brought into face contact with the outer periphery of the tire A, which offers an advantage that the outer peripheral surface of the tire A is not deformed by the end portion of the gripping member 5.

The preferred embodiment described in this specification is a typical one and not a limited one. The scope of the invention is described in the appended claims, and all changes and modifications included in the teachings of these claims are embraced in the present invention.

What is claimed is:

1. An article gripping device comprising:
   a device body;

a first ring extending circumferentially about and radially from a center point, the first ring fixed to the device body;

a plurality of gripping members arranged in a circumferential direction on an inner periphery side of the first ring, said gripping members operative to rectilinearly move along a radial direction relative to the center point and to and between a non-gripping state and a gripping state, each of said gripping members as viewed in the circumferential direction having convex portions in a form of fingers at one end and concave portions in a form of recesses at an opposing end so that consecutive ones of the gripping members engage with each other by the convex portions of one gripping member being slidably received by the concave portions of a next gripping member when in and moving between the non-gripping state and the gripping state;

a support mechanism for supporting each of said gripping members so that said gripping members can be moved in the radial direction, said support mechanism including a fixed member fixed to said first ring and a movable member fixed to the gripping members, said movable member engaged with a groove provided in the fixed member so as to be slidable in the radial direction, the groove is formed to guide said movable member in the radial direction to extend to the radial direction; and a linking mechanism connected to each support mechanism, each of said linking mechanisms being configured and arranged for moving one of said movable members in the radial direction.

2. The article gripping device according to claim 1, further comprising:
a plurality of linking mechanisms each provided with an adjusting mechanism capable of adjusting a position of said gripping members in the radial direction.

3. The article gripping device according to claim 2, wherein
a gripping surface of said gripping members is formed so as to have a curvature not smaller than an outside diameter of an article having the maximum diameter of many kinds of articles to be gripped.

4. The article gripping device according to claim 1, wherein
a gripping surface of said gripping members is formed so as to have a curvature not smaller than an outside diameter of an article having the maximum diameter of many kinds of articles to be gripped.

5. The article gripping device according to claim 1, wherein each of said linking mechanisms includes an L-shaped member.

6. The article gripping device according to claim 1, wherein each of said linking mechanisms includes a first link formed in a straight shape, a second link formed in an L-shape, and an adjustment link.

7. An article gripping device comprising:
a device body;
a first ring extending circumferentially about and radially from a center point, the first ring fixed to the device body;

a plurality of gripping members arranged in a circumferential direction on an inner periphery side of the first ring, said gripping members operative to rectilinearly move along a radial direction relative to the center point and to and between a non-gripping state and a gripping state, each of said gripping members as viewed in the circumferential direction having convex portions in a form of fingers at one end and concave portions in a form of recesses at an opposing end so that consecutive ones of the gripping members engage with each other by the convex portions of one gripping member being slidably received by the concave portions of a next gripping member when in and moving between the non-gripping state and the gripping state; and a support mechanism for supporting each of said gripping members so that said gripping members can be moved in the radial direction, said support mechanism including a fixed member fixed to said first ring and a movable member fixed to the gripping members, said movable member engaged with a groove provided in the fixed member so as to be slidable in the radial direction, the groove is formed to guide said movable member in the radial direction to extend to the radial direction;

a second ring capable of turning in the circumferential direction with respect to said first ring;

a driving mechanism for turning said ring in the circumferential direction; and a plurality of linking mechanisms for moving said gripping members in the radial direction in association with the turning of said second ring, said linking mechanisms for moving said gripping members in the radial direction with the turning of said second ring, said linking mechanisms each including an L-shaped member.

8. The article gripping device according to claim 7, wherein
said linking mechanisms are each provided with an adjusting mechanism capable of adjusting a position of said gripping members in the radial direction.

9. The article gripping device according to claim 7, wherein
a gripping surface of said gripping members is formed so as to have a curvature not smaller than an outside diameter of an article having the maximum diameter of many kinds of articles to be gripped.

10. The article gripping device according to claim 7, wherein each of said linking mechanisms further includes:
a straight link, having one end thereof pivotably connected to one of said movable members and another end thereof pivotably connected to one of said L-shaped members; and an adjustment link having one end thereof pivotably connected to one of said L-shaped members and another end thereof pivotably connected to said second ring.

* * * * *